US010690761B2

(12) United States Patent
Itkin

(10) Patent No.: US 10,690,761 B2
(45) Date of Patent: Jun. 23, 2020

(54) RADIO FREQUENCY DEVICE, SYSTEM COMPRISING RADIO FREQUENCY DEVICE, AND CORRESPONDING METHODS

(71) Applicant: Infineon Technologies AG, Neubiberg (DE)

(72) Inventor: Grigory Itkin, Munich (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 16/269,188

(22) Filed: Feb. 6, 2019

(65) Prior Publication Data
US 2019/0250261 A1 Aug. 15, 2019

(30) Foreign Application Priority Data
Feb. 9, 2018 (DE) .................. 10 2018 102 979

(51) Int. Cl.
*G01S 13/04* (2006.01)
*H04B 1/00* (2006.01)
*H04B 1/18* (2006.01)
*H04B 1/44* (2006.01)
*H04B 1/04* (2006.01)

(52) U.S. Cl.
CPC ............ *G01S 13/04* (2013.01); *H04B 1/0057* (2013.01); *H04B 1/0067* (2013.01); *H04B 1/04* (2013.01); *H04B 1/18* (2013.01); *H04B 1/44* (2013.01); *H04B 2001/0408* (2013.01)

(58) Field of Classification Search
CPC ............................ G01S 13/04; H04B 1/0057
See application file for complete search history.

(56) References Cited

U.S. PATENT DOCUMENTS

| | | | |
|---|---|---|---|
| 9,684,063 B1 * | 6/2017 | Neumayer | G01S 7/2923 |
| 2007/0257819 A1 * | 11/2007 | Manor | G01S 13/91 340/933 |
| 2013/0050486 A1 * | 2/2013 | Omer | H04N 21/41422 348/144 |
| 2013/0176161 A1 * | 7/2013 | Derham | G01S 7/36 342/27 |
| 2014/0022108 A1 * | 1/2014 | Alberth, Jr. | G01S 13/04 342/52 |
| 2014/0355532 A1 * | 12/2014 | Shapira | H04W 72/08 370/329 |
| 2015/0063147 A1 * | 3/2015 | Sadek | H04J 1/16 370/252 |
| 2015/0110058 A1 * | 4/2015 | Shapira | H04B 1/3805 370/329 |
| 2015/0260835 A1 * | 9/2015 | Widmer | G01S 13/04 342/27 |
| 2015/0349770 A1 | 12/2015 | Bakalski et al. | |
| 2019/0044551 A1 * | 2/2019 | Dinc | H04B 1/0082 |
| 2019/0167500 A1 * | 6/2019 | Baker | A61G 7/0527 |

* cited by examiner

*Primary Examiner* — David Bilodeau
(74) *Attorney, Agent, or Firm* — Design IP

(57) ABSTRACT

Radio frequency device, system comprising radio frequency device, and corresponding methods. Radio Frequency devices are provided where a radio frequency circuit may be selectively coupled to a radar circuit or a communication circuit.

22 Claims, 5 Drawing Sheets

RADIO FREQUENCY DEVICE, SYSTEM COMPRISING RADIO FREQUENCY DEVICE, AND CORRESPONDING METHODS

FIELD

The present application relates to radio frequency devices, systems including such radio frequency devices and corresponding methods.

BACKGROUND

Radar devices may be used to detect objects by emitting a radio frequency (RF) signal and receiving a reflected portion of this signal from an object to be detected. Communication devices use radio frequency signals to communicate voice and data, for example via a mobile communications network. In some applications, both radar devices and mobile communication devices are required. For example, modern cars, in particular, cars intended for autonomous driving, are equipped with radar sensors to detect other vehicles or obstacles. Furthermore, modern cars are equipped with mobile communication facilities for example to be able to access the internet or to communicate with other cars (car2car communication) or with infrastructure objects. In current systems, radar and communication are implemented separately.

SUMMARY

A radio frequency device and a method are provided. The claims define embodiments and further embodiments including systems with such a radio frequency device and vehicles with such a system.

According to an embodiment, a radio frequency device is provided, including: a radio frequency circuit, the radio frequency circuit including a terminal to be coupled to at least one antenna, a multiplexer coupled to the radio frequency circuit, wherein the multiplexer is configured to selectively couple the radio frequency circuit to a first terminal to be coupled to a radar circuit or a second terminal to be coupled to a communication circuit.

In some embodiments, with such a devices a single radio frequency circuit may be used both for radar and communication. In some embodiments, in this way costs may be reduced.

The radio frequency circuit may include one or more of a digital front end, a digital-to-analog convertor, an analog-to-digital converter, a frequency up-conversion circuit, a frequency down-conversion circuit, an amplifier or an analog front end. In other embodiments, other components used in conventional radio frequency circuits for radar applications or communication applications may be used.

The radio frequency circuit in some embodiments may be configured to operate in a frequency range including a mobile communication frequency range and a radar frequency range. Therefore, in some embodiments the same radio frequency circuit is usable both for mobile communication and radar.

In some embodiments, the radio frequency circuit may includes a plurality of radio frequency circuits, each of the plurality of radio frequency circuits being coupled with the multiplexer and to be coupled with a respective antenna via the terminal. In this way, in some embodiments a plurality of channels for radar and/or communication may be provided. A channel, in this respect, relates to a path where signals to and from an antenna (or antenna arrangement) are processed. To provide several independent radar measurements and/or communications, several channels are usually provided.

The multiplexer in some embodiments may include exactly one first terminal to be coupled to a radar circuit providing one radar channel and exactly one second terminal to be coupled to a communication circuit providing one communication channel. In such embodiments, each of a plurality of radio frequency circuits may be coupled either to the radar circuit or the communication circuit, e.g. to use one of the radio frequency circuits for radar and another one for communication.

In some other embodiments, the multiplexer may include a plurality of first terminals to be coupled to a plurality of radar circuits, wherein each radar circuit is associated with one of a plurality of radar channels, wherein the multiplexer is adapted to selectively couple each radio frequency circuit with an associated first terminal of the plurality of first terminals. In this way, the plurality of radio frequency circuits may be used in parallel to provide a plurality of radar channels.

In such embodiments, the multiplexer may includes exactly one second terminal to be coupled to a communication circuit providing one communication channel. In such embodiments, one of the radio frequency circuits may selectively be used for communication. In other embodiments, a plurality of second terminals may be provided.

The multiplexer, in a mode of operation, may be configured to couple a first subset of the plurality of radio frequency circuits to the first terminal and a second subset of the plurality of radio frequency circuits to the second terminal to provide radar and communication concurrently.

In such embodiments, the multiplexer, in a further mode of operation, may be configured to couple some or all of the radio frequency circuits of the second subset to the first terminal to enhance radar functionality. Such a further mode of operation may for example be employed when an object is detected.

In another embodiment, a system is provided, including:
any radio frequency device as explained above,
at least one radar circuit coupled to the first terminal of the multiplexer, and
at least one communication circuit coupled to the second terminal of the multiplexer. In this way, in some embodiments a combined radar/communication system may be provided.

The radar circuit may be a radar baseband circuit. The communication circuit may be a communication baseband circuit.

The communication circuit may include a mobile network communication circuit. In this way, for example in vehicles mobile communication may be provided.

At least one of the radar circuit or the communication circuit may include a digital signal processor. This in some embodiments allows for a versatile and easy implementation by programming the digital signal processor accordingly.

Furthermore, a vehicle is provided, including any system as discussed above.

According to another embodiment, a method for operating a system in a radar mode or in a communication mode is provided, including:
coupling a radio frequency circuit to a radar circuit for radar mode, and
coupling the radio frequency circuit to a communication circuit for communication mode.

In some embodiments, with such a method a single radio frequency circuit may be used both for radar and communication. In some embodiments, in this way costs may be reduced.

Coupling the radio frequency circuit to the communication circuit in some embodiments may include coupling one of a plurality of radio frequency circuits to the communication circuit, and coupling others of the plurality of radio frequency circuits to a further radar circuit or the radar circuit. In this way, in some embodiments radar and communication may be provided concurrently.

The method may further include,
when the radio frequency circuit is coupled to the communication circuit, detecting an object based on a signal received via another radio frequency circuit coupled to a further radar circuit, and
coupling the radio frequency communication circuit to the radar circuit in response to detecting the object. In some embodiments, in this way radar may be enhanced when an object is detected.

The above summary is merely a short overview over some features of some embodiments and is not to be construed as limiting, as other embodiments may include other features than the ones explicitly listed above.

DETAILED DESCRIPTION

In the following, various embodiments will be discussed in detail referring to the attached drawings. These embodiments are given as examples only and are not to be construed in a limiting sense. For example, while embodiments may be described as comprising various features or components, in other embodiments some of these features or components may be omitted and/or may be replaced by alternative features or components. Furthermore, in addition to the feature are components explicitly shown and described, further features or components, for example features or components used in conventional radar devices or communication devices, may be provided.

Features from various embodiments shown a described may be combined to form further embodiments. Variations, modifications or details described with respect to one of the embodiments may also be applied to other embodiments and will not be described repeatedly.

In some embodiments, a common radio frequency circuit used both for implementing a radar and for implementing communication like mobile communication. The common radio frequency circuit may be selectively coupled to a radar circuit, for example a radar baseband circuit, or a communication circuit, for example baseband communication circuit, via a multiplexer. In such embodiments, by using a common radio frequency circuit, less components may be needed than in case of a separate implementation of radar and communication.

Radio frequency (RF) generally relates to frequencies in the range extending from around 20 kHz to 300 G Hz, which thoroughly used the frequency in radio communication, mobile communication and radar. In particular, radio frequency may relate to a frequency between 1 and 200 GHz, for example between 50 and 100 GHz.

Figure 1:
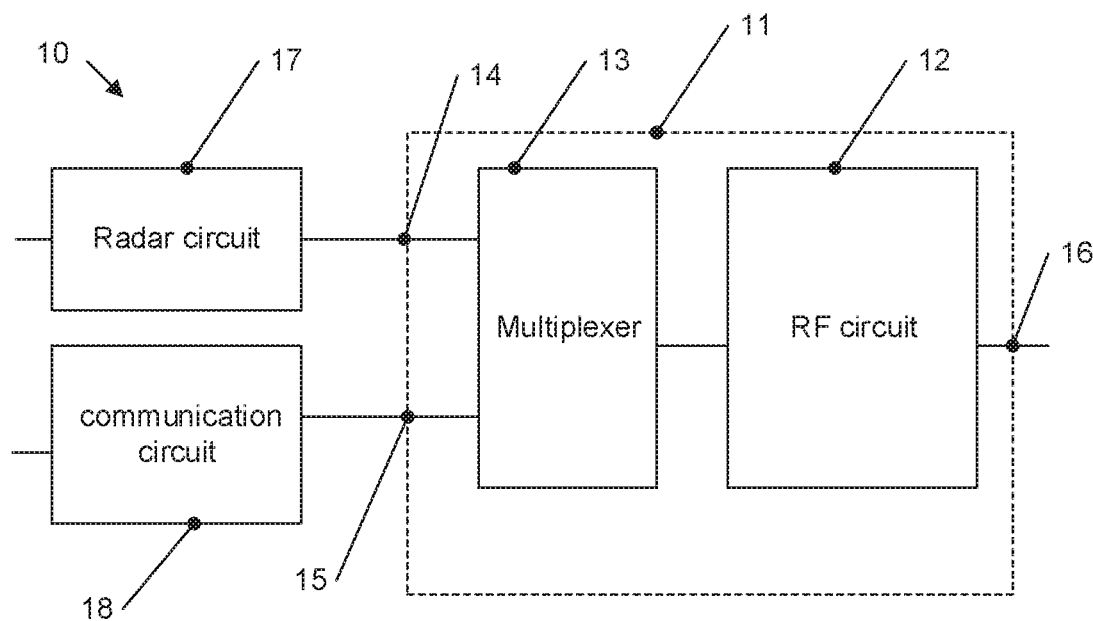
FIG. 1 is a block diagram of a radio frequency device and system according to some embodiments.

Turning now to the Figs., FIG. 1 illustrates a system 10 comprising a radio frequency (RF) device according to an embodiment.

Device 11 comprises a radio frequency circuit 12. A radio frequency circuit as used herein is a circuit adapted to process radio frequency signals, in particular for transmitting and receiving such radio frequency signals. Via a terminal 16, radio frequency circuit 12 may be coupled to an antenna arrangement to receive signals from the antenna arrangement and/or to provide signals to the antenna arrangement. An antenna arrangement refers to an arrangement of one or more antennas. When receiving signals, RF circuit may filter the received signals, convert the signals to a lower frequency like a baseband frequency (frequency down-conversion) and/or digitize the received signals to provide a digital signal. For transmitting signals, RF circuit 12 may be configured to perform a digital to analog conversion of a signal to be transmitted, a frequency up-conversion to radio frequency, and/or filtering. In addition, RF circuit 12 may amplify received signals and/or signals to be transmitted. A particular implementation example for RF circuit 12 will be discussed later referring to FIG. 2.

In embodiments, RF circuit 12 is designed for a frequency range usable both for communication and radar applications. As an example, the fifth generation (5G) mobile communication standard may be implemented in a frequency range from 64 to 71 GHz, while for example middle range automotive radars may use a frequency range between 77 and 81 GHz in some implementations. These frequency ranges are close to each other, such that RF circuit 12 may be designed to be operable in both frequency ranges, for example between 64 and 81 GHz. However, RF circuit 12 is not limited to these ranges, and the design of RF circuit 12 may be adapted to a particular communication like a mobile communication network or another type of wireless communication like Wi-Fi or Bluetooth, and/or to a particular type of radar system such as frequency modulated continuous wave radar (FMCW radar).

A terminal of RF circuit 12 is coupled to a multiplexer 13. A multiplexer is a device which, for example by using one or more switches, may selectively couple RF circuit 12 to two or more terminals. In the example of FIG. 1, multiplexer 13 may selectively couple RF circuit 12 to a terminal 14 or a terminal 15. Terminal 14 is adapted to be coupled to a radar circuit 17. Radar circuit 17 may for example be a digital signal processor (DSP) adapted to process radio signal, for example to provide a digital representation of a radar signal to be transmitted to RF circuit 12 via multiplexer 13 and to analyze a digital representation received from RF circuit 12 via multiplexer 13 of received reflection.

Communication circuit 18 may also be implemented as a digital signal processor and may be configured to process communication signals to be transmitted via RF circuit 12 or received from RF circuit 12, for example mobile communication network signals like 5G signals.

The system of FIG. 1 may therefore be operated in radar mode where multiplexer 13 couples to RF circuit 12 to radar circuit 7 or in a communication mode where multiplexer 13 couples RF circuit 12 to communication circuit 18. In such embodiments, only one RF circuit 12 is needed both for implementing a radar device and for implementing a communication device.

In other implementations, radio circuit 17 and/or communication circuit 18 may be at least partially analog circuits outputting an analog signal to RF circuit 12 via multiplexer 13 or receiving an analog signal from RF circuit 12 via multiplexer 13.

A particular example for an RF circuit usable in some embodiments will now be described referring to FIG. 2. While the implementation example of FIG. 2 shows numerous details, it should be noted that FIG. 2 is merely a non-limiting example for a RF circuit usable in some embodiments, and any conventional techniques and implementations for RF circuits usable for the required frequency range covering both radar and communication may be employed.

Figure 2:
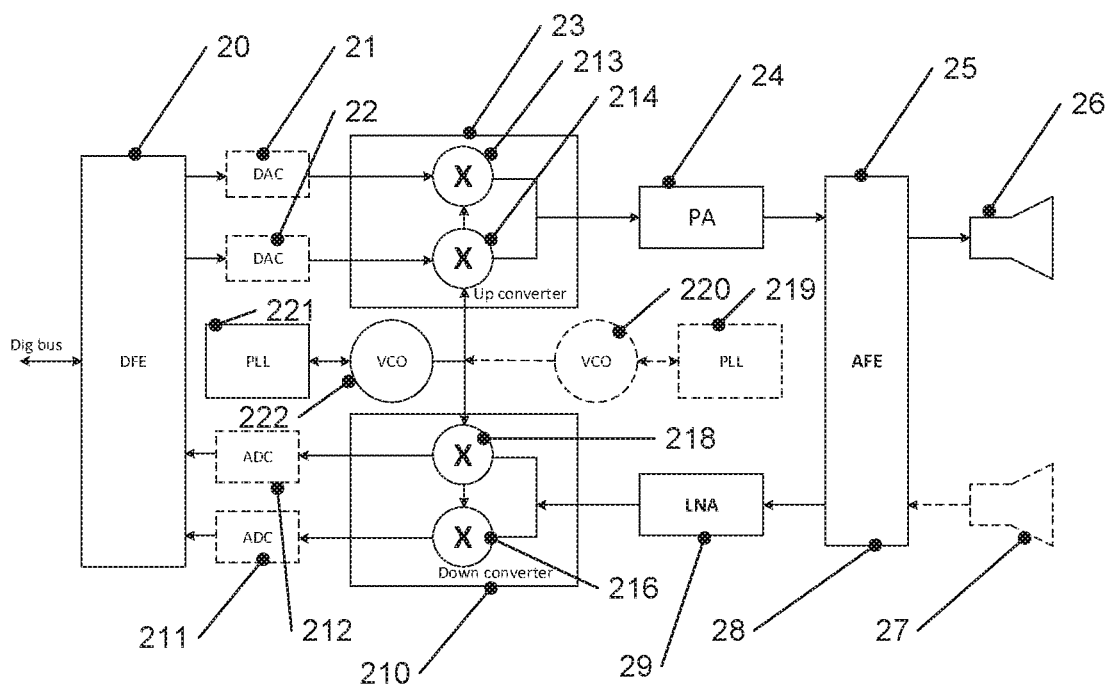
FIG. 2 is an illustrative example for a radio frequency circuit usable in some embodiments.

The RF circuit of FIG. 2 comprises a digital frontend (DFE) 20 to receive digital signals to be transmitted or to output a digital version of received signals. Digital frontend 20 may receive such digital signals or transmit such digital signals via a digital bus, which in the example of FIG. 1 may then be coupled to multiplexer 13. Digital frontend 20 may provide digital filter functions to the signals.

Digital signals to be transmitted are provided to two digital-to-analog converters 21, 22 by digital frontend 20 to convert them into analog signals. In the example shown, the outputs of digital-to-analog converters 21, 22 are provided to a mixer circuit 23 comprising two mixers 213, 214 for frequency up-conversion by mixing the analog signal with a local oscillator signal. Furthermore, the mixing may provide modulation to the signals. In other embodiments, a separate modulator may be provided. By using two digital-to-analog converters 21, 22 and two mixers 213, 214 a so-called balanced mixer circuit as shown for mixer circuit 23 in FIG. 2 may be provided. Instead of a single stage mixer circuit 23 for up conversion as shown in FIG. 2, also a plurality of mixer stages may be provided for up-converting in more than one step. In some embodiments, instead of a balanced mixer structure a single mixer may be provided.

The local oscillator signal for mixers 213, 214 of mixer circuit 23 is provided by a voltage controlled oscillator 222 controlled by a phase-locked loop (PLL) 221. Instead of the combination of oscillator 222 and PLL 211, any other conventional signal generating circuitry may be used.

An output signal of mixer circuit 23 is provided to a power amplifier (PA) 24 and from there to an analog front end (AFE) 25. Analog front end 25 may provide filtering to receive amplified signals from power amplifier 24 and outputs the signal to one or more transmit antennas 26. While a single antenna 26 is shown in FIG. 2, in some applications an array of antennas may be used together with beam-forming techniques, where for example phases and/or amplitudes of signals provided to the plurality of antennas are modified to generate a desired radiation pattern through constructive and destructive interference. Any conventional beam-forming techniques may be employed in the respect.

In a receive direction, signals may be received at antenna 26, in which case antenna 26 serves both as transmit and receive antenna. Alternatively or additionally, signals may be received via an additional antenna 27, in which case antenna 26 may serve only as transmit antenna and antenna 27 may serve only as receive antenna. Similar to what has already been explained for antenna 26, also for antenna 27 an array of antennas and beam-forming may be used to permit spatially selective receiving. Any conventional beam-forming techniques may be used.

The received signal (from antenna 26 or 27) is provided to analog frontend 28, which may provide filtering for the received signals, followed by a low-noise amplifier (LNA) 29. The thus amplified signal is then down-converted to a baseband frequency by a mixer circuit 210 having two mixers 216, 218 forming a balanced mixer structure. In other embodiments, similar to what has explained mixer circuit 23, a single mixer and/or a plurality of mixer stages may be provided.

For down-conversion, in some embodiments the same local oscillator signal as for up-conversion may be used, i.e. generated by voltage controlled oscillator 222 controlled by PLL 221. In other embodiments, a separate local oscillator signal may be used, for example generated by a voltage controlled oscillator 220 controlled by a PLL 219. Separate local oscillator signals may, in particular, be used in cases where carrier frequencies for transmitting and receiving are different.

Output signals from mixer circuit 210 are digitized by analog-to-digital converters 211, 212, filtered by digital front end 20 and output to the digital bus, for example to multiplexer 13 in FIG. 1.

Figure 3:
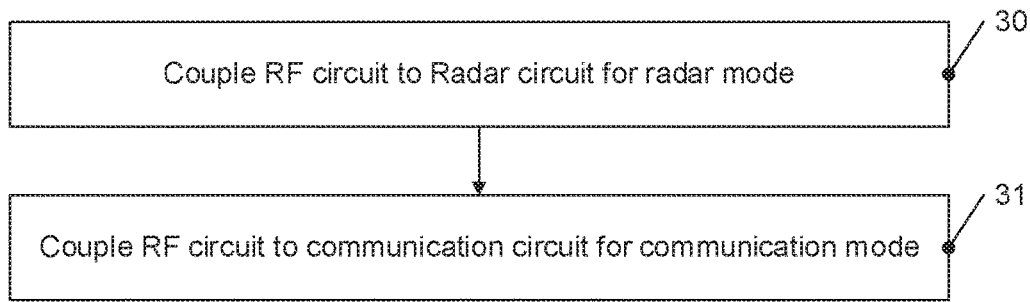
FIG. 3 is a flow chart illustrating a method according to some embodiments.

FIG. 3 is a flow chart illustrating a method according to an embodiment. While the method of FIG. 3 is depicted as a series of acts or events, the order in which these acts or events are described is not to be construed as limiting. The method of FIG. 3 will be explained referring to the system of FIG. 1, but may be also implemented in other systems and devices, for example systems described further below referring to FIGS. 4 and 5 or other systems.

At 30, the method comprises coupling a radio frequency circuit to a radar circuit for operation in a radar mode. For example, at 30 RF circuit 12 if FIG. 1 may be coupled to radar circuit 17 via multiplexer 13.

At 31, the method comprises coupling the RF circuit to a communication circuit for a communication mode. For example, at 31 RF circuit 12 of FIG. 1 may be coupled to communication circuit 18 via multiplexer.

After 31, again the RF circuit may be coupled to the radar circuit at 30 to switch back to radar mode.

Figure 4:
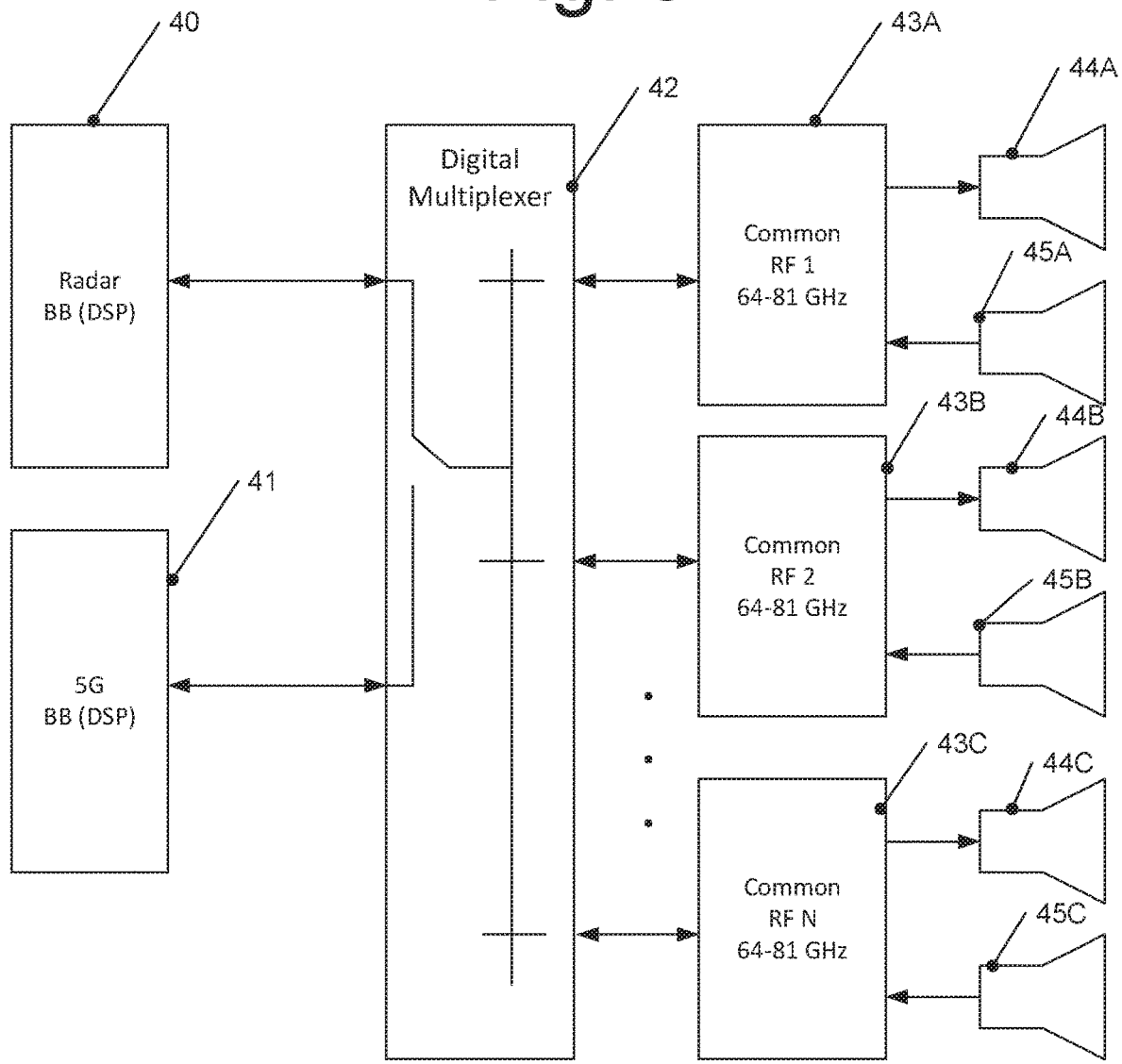
FIG. 4 is a diagram illustrating a system according to an embodiment.

FIG. 4 illustrates a system according to an embodiment. The system of FIG. 4 comprises a plurality of RF circuits, of which three RF circuits 43A, 43B, 43C are shown. However, the number of three RF circuits is merely an example and is not to be construed as limiting. Each RF circuit 43A-C is coupled with a respective transmit antenna arrangement 44A-C and a corresponding receive antenna arrangement 45A-C. Each RF circuit 43A-C together with its associated antennas may for example be implemented as discussed with reference to FIG. 2, including all variations discussed with reference to FIG. 2.

Each of RF circuits 43A-C in the embodiment of FIG. 4 is configured to operate in a range of 64-81 GHz, covering both radar application and 5G mobile communication. In other applications, other frequency ranges may be used, for example frequencies for other types of communication and/or other types of radar systems.

In the embodiment of FIG. 4, each RF circuit 43A-43C is coupled to a digital multiplexer 42 to provide digital signals to digital multiplexer 42 when receiving signals via its corresponding receive antenna and to receive digital signals from digital multiplexer 42 to be transmitted via the corresponding transmit antenna. In other implementations, multiplexer 42 may be an analog multiplexer to provide analog signals to and receive analog signals for RF circuits 43A-

43C. Digital multiplexer is adapted to selectively couple the RF circuits 43A-43C either to a radar baseband circuit 40 associated with a radar channel or a fifth generation (5G) mobile communication baseband circuit 41 associated with a communication channel. Each of circuits 40, 41 may be implemented using a digital signal processor (DSP).

In the embodiment of FIG. 4, therefore one radar baseband circuit 40 serves all RF circuits 43A-43C for a radar mode, and one 5G communication baseband circuit 41 serves all RF circuits 43A-43C in a communication mode.

Figure 5:
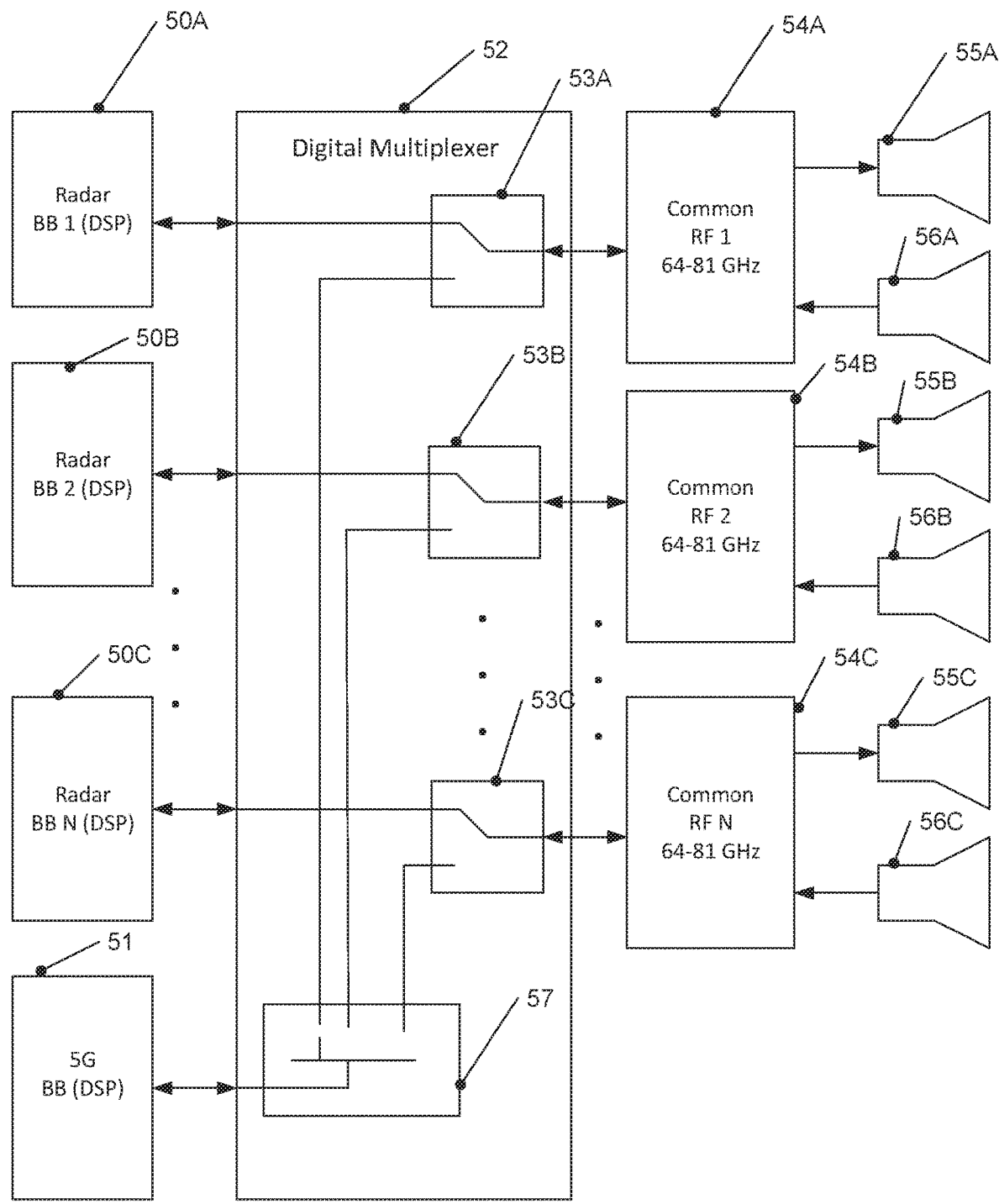
FIG. 5 is a diagram illustrating a system according to an embodiment.

FIG. 5 illustrates a variation of the embodiment of FIG. 4. The system of FIG. 5 comprises a plurality of RF circuits 54A-54C, each with an associated transmit antenna 55A-55C and an associated receive antenna 56A-56C. Details and variations described with respect to RF circuits 43A-43C with their respective antennas also apply to RF circuits 54A-54C with corresponding antennas of the system of FIG. 5.

RF circuits 54A-54C are coupled with a digital multiplexer 52. Digital multiplexer 52 is coupled with a plurality of radar baseband circuits 50A-50C each being associated with a respective radar channels and with a fifth generation (5G) mobile communication baseband circuit 51. In some embodiments, the number of radar baseband circuits 50A-50C corresponds to the number of RF circuits 54A-54C although this need not be the case and in other embodiments two or more RF circuits may share a baseband circuit (similar to the sharing of FIG. 4). Each of radar baseband circuits 50A-50C and 5G mobile communication baseband circuit 51 may be implemented as a digital signal processor. Instead of 5G mobile communication, other types of mobile communication may be used, as already explained further above.

Digital multiplexer 54 has a functionality as represented by switches 53A-53C and a multi switch 57. The number of switches 53A-53C may correspond to the number of RF circuits 54A-54C and the number of radar baseband circuits 50A-50C.

Via each of switches 53A-53C, a corresponding RF circuit 54A-54C may be coupled to an associated radar baseband circuit 50A-50C in a first position of the respective switch 53A-53C. Therefore, each of RF circuits 54A-54C together with its antennas and associated radar baseband circuit 50A-50C may implement a radar device.

In a second position of each of switches 53A-53C, the respective RF circuit 54A-54C is coupled to multi switch 57. Via multi switch 57, this RF circuit may then be coupled to 5G mobile communication baseband circuit 51. Therefore, each of RF circuits 54A-54C together with 5G mobile communication baseband circuit 51 may also form a communication device. In other words, according to some embodiments the number of channels used for the radar device may be configurable such that in a first mode the full number of available channels are used for radar transmission and in a second mode at least one of the RF circuits is switched to provide a communication channel operating parallel to a reduced number of radar channels.

In some applications, as an example one of RF circuits 54A-54C may be coupled to 5G mobile communication baseband circuit 51 to implement a communication device, and the remaining RF circuits 54A-54C may be operated in radar mode by coupling them to the respective radar baseband circuit 50A-50C.

It should be noted that while a plurality of circuits are shown in FIGS. 4 and 5 (radio frequency circuits, radar circuits, communication circuits), this does not indicate that the circuits need to be implemented on separate chips or in separate packages. Instead, two or more or even all of the circuits shown and described may be implemented on a single chip.

To give a non-limiting example how systems like the ones discussed above may be used, FIG. 6 illustrates an application example in an automotive environment.

Figure 6:
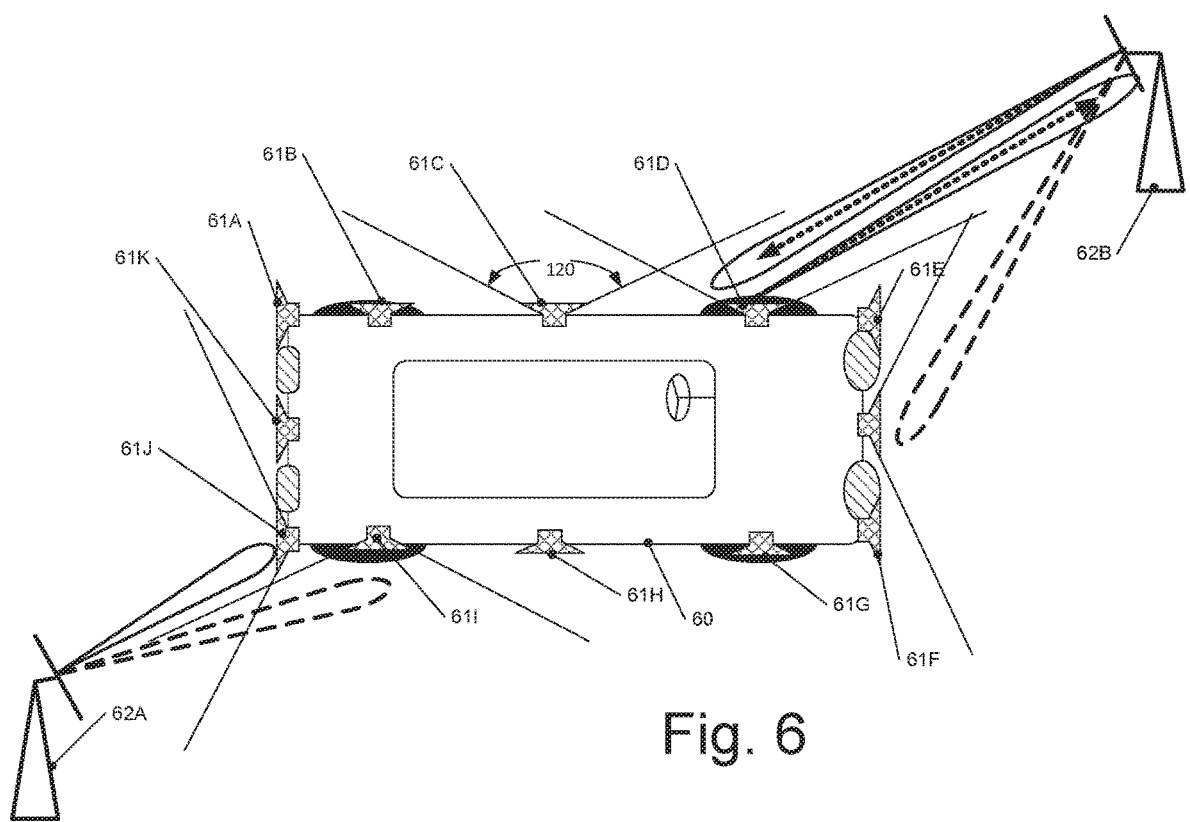
FIG. 6 illustrates a car as an example application environments for some embodiments.

FIG. 6 schematically shows a vehicle, in this case a car 60, equipped with a plurality of antenna arrangements 61A-61K. Each antenna arrangement may comprise one or more transmit antennas and one or more receive antennas and may cover an angular range of about 120 degrees (or another range, depending on design of the antenna arrangement) as schematically indicated for some of the antenna arrangements, for example antenna arrangement 61C. Each of antenna arrangement 61A-61K may correspond to antennas 44, 45 of FIG. 4 or 55, 56 of FIG. 5 and may be coupled with a respective RF circuit, as illustrated in FIGS. 4 and 5.

In the example of FIG. 6, antenna arrangement 61D communicates with a base station 62B for mobile communication and antenna arrangement 61J communicates with a base station 62A for mobile communications. In other embodiments, the antenna arrangement 61D may provide a V2X communication from the vehicle to communication entities such as a communication to another vehicle to exchange information between two vehicles (V2V communication), a communication to an infrastructure (V2I communication), a communication to Pedestrians (V2P communication) etc.

In this scenario, the RF circuits coupled to antenna arrangements 61D, 61J are coupled to a communication baseband circuit like communication circuit 18 of FIG. 1, 5G baseband circuit 41 of FIG. 4 or 5G communication baseband circuit 51 of FIG. 5 via a multiplexer.

RF circuits coupled to the remaining antenna arrangements are coupled with one or more radar baseband circuits (for example radar baseband circuit 17 of FIG. 1, radar baseband circuit 40 of FIG. 4 or the respective radar baseband circuit 50A-50C of FIG. 5) to operate in a radar mode for example to detect obstacles or other vehicles around car 60 when driving.

In this scenario, an area covered by antenna arrangement 61D which is used for mobile communication may be essentially covered by antenna arrangement 61C, 61E operating as radars, and similar an area covered by antenna arrangement 61J used for mobile communication may be essentially covered by antenna arrangement 61K, 61l operating as radar.

In some embodiments, when an obstacle is detected using antenna arrangements 61C, 61E in radar mode which requires attention, using the respective multiplexer, like multiplexer 13, multiplexer 42 or multiplexer 52, the RF circuit coupled to antenna arrangement 61D may be coupled to a respective radar baseband circuit to also operate in radar mode, to provide a better coverage of the respective area where the object was detected. After the object has left the range or it has been determined that the object does not give rise to any action (warning to a driver, automatic evasive or breaking maneuvers etc.), there may be a switchback to reestablish mobile communication.

The treatment of detected obstacles and the like may be performed in any conventional manners used for radar systems in automotive driving and object detection applications for vehicles and will not be described herein in detail.

Figure 7:
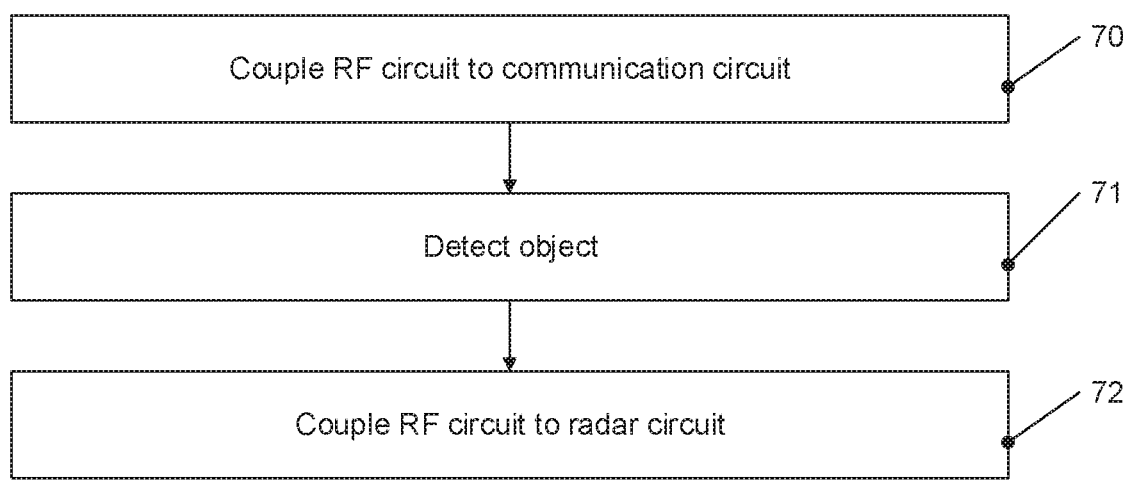
FIG. 7 is a flow chart illustrating a method according to an embodiment.

FIG. 7 is a flow chart of a method illustrating techniques as discussed with reference to FIG. 6. However, use of the method of FIG. 7 is not restricted to cars as shown in FIG. 6, but may be applied to any application where objects are detected using radar systems. Nevertheless, for ease of illustration the method of FIG. 7 will be described referring to FIG. 6.

At 70 in FIG. 7, the method comprises coupling an RF circuit to a communication circuit to establish mobile communication, for example 5G mobile communication. For example, in FIG. 6 an RF circuit coupled to antenna arrangement 61D may be couple to a communication circuit to establish communication with base station 62B.

At 71, the method comprises detecting an object, for example at or near an area covered by an antenna arrangement coupled to the RF circuit mentioned at 70. In FIG. 6, an object may be detected using antenna arrangement 61C and/or 61E and circuits coupled thereto.

At 72, in response to detecting the object the RF circuit is coupled to a radar circuit to provide a radar device. In FIG. 6 in this example scenario the RF circuit coupled to antenna arrangement 61D would be coupled to a radar circuit to provide better coverage of the area the object was detected in.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

LIST OF REFERENCE NUMBERS 10 system
11 radio frequency device
12 radio frequency circuit
13 multiplexer
14 first terminal
15 second terminal
16 antenna terminal
17 radar circuit
18 communication circuit
20 digital front end
21 digital-to-analog converter
22 digital-to-analog converter
23 mixer circuit
24 power amplifier
25 analog front end
26 antenna
27 antenna
29 low-noise amplifier
210 mixer circuit
211 analog-to-digital converter
212 analog-to-digital converter
213 mixer
214 mixer
216 mixer
218 mixer
219 phase-locked loop
220 voltage controlled oscillator
221 phase-locked loop
222 voltage controlled oscillator
30 method
31 method
40 radar baseband circuit
41 5G communication baseband circuit
42 digital multiplexer
43A-43C radio frequency circuits
44A-44C transmit antennas
45A-45C receive antennas
50A-50C radar baseband circuits
51 5G communication baseband circuit
52 digital multiplexer
53A-53C switches
54A-54C radio frequency circuit
55A-55C transmit antennas
56A-56C receive antenna
57 multi switch
60 vehicle
61A-61K antennas
62A base station
62B base station
70-72 method

What is claimed is:

1. A radio frequency device, comprising:
a radio frequency circuit, the radio frequency circuit including a first terminal to be coupled to at least one antenna, an analog front end circuit comprising the first terminal, a frequency up-conversion circuit arranged in a signal transmission path and configured to frequency up-convert transmission signals, and a frequency down-conversion circuit arranged in a signal reception path and configured to frequency down-convert reception signals; and
a multiplexer coupled to the signal transmission path and the signal reception path of the radio frequency circuit, wherein the multiplexer is configured to selectively couple the radio frequency circuit to a second terminal to be coupled to a radar circuit configured to receive and transmit radar signals or to a third terminal to be coupled to a communication circuit configured to receive and transmit communication signals.

2. The radio frequency device of claim 1, wherein the radio frequency circuit further includes a digital front end coupled to the multiplexer via a digital bus and further includes at least one digital-to-analog convertor and at least one analog-to-digital converter.

3. The radio frequency device of claim 1, wherein the radio frequency circuit is configured to operate in a frequency range including a mobile communication frequency range and a radar frequency range.

4. The radio frequency device of claim 1, wherein:
the frequency up-conversion circuit includes at least one up-conversion element that is configured to frequency up-convert both radar transmission signals and communication transmission signals, and
the frequency down-conversion circuit includes at least one down-conversion element that is configured to frequency down-convert both radar reception signals and communication reception signals.

5. A radio frequency device, comprising:
a plurality of radio frequency circuits, each including a respective first terminal to be coupled to at least one antenna; and
a multiplexer coupled to each of the plurality of radio frequency circuits,
wherein the multiplexer is configured to selectively couple each of the plurality of radio frequency circuits to a second terminal to be coupled to a radar circuit or to a third terminal to be coupled to a communication circuit.

6. The radio frequency device of claim 5, wherein the multiplexer comprises the second terminal as an only terminal to be coupled to the radar circuit to provide one radar channel, and comprises the third terminal as an only terminal to be coupled to the communication circuit to provide one communication channel.

7. The radio frequency device of claim 5, wherein the multiplexer comprises a plurality of second terminals to be coupled to a plurality of radar circuits, including the radar circuit, wherein each radar circuit is associated with one of a plurality of radar channels, wherein the multiplexer is adapted to selectively couple each radio frequency circuit of the plurality of radio frequency circuits with an associated second terminal of the plurality of second terminals.

8. The radio frequency device of claim 7, wherein the multiplexer comprises the third terminal as an only terminal to be coupled to the communication circuit to provide one communication channel.

9. The radio frequency device of claim 7, wherein the multiplexer is configured to selectively couple a first subset of the plurality of radio frequency circuits to at least one associated second terminal and selectively couple a second subset of the plurality of radio frequency circuits to the third terminal, the first subset and the second subset being mutually exclusive to each other.

10. The radio frequency device of claim 9, wherein the first subset and the second subset operate in parallel such that radar data is transmitted between the first subset and at least one of the plurality of radar circuits concurrently with communication data being transmitted between the second subset and the communication circuit.

11. The radio frequency device of claim 9, wherein the first subset and the second subset operate in parallel such that radar data and communication data are concurrently transmitted through the multiplexer.

12. The radio frequency device of claim 5, wherein:
the multiplexer includes at least one second terminal, including the second terminal, and at least one third terminal, including the third terminal, and
the multiplexer, in a mode of operation, is configured to couple each radio frequency circuit of a first subset of the plurality of radio frequency circuits to a respective associated second terminal of the at least one second terminal and couple each radio frequency circuit of a second subset of the plurality of radio frequency circuits to a respective associated third terminal of the at least one third terminal to provide radar data and communication data concurrently through the multiplexer.

13. The radio frequency device of claim 12, wherein the multiplexer, in a further mode of operation, is configured to couple each radio frequency circuit of the first subset of the plurality of radio frequency circuits to its respective associated second terminal, couple at least a first radio frequency circuit of the second subset of the plurality of radio frequency circuits to its respective associated third terminal, and couple at least a second radio frequency circuit of the second subset of the plurality of radio frequency circuits to its respective associated second terminal, to provide radar data and communication data concurrently through the multiplexer and to enhance radar functionality.

14. A system, comprising:
a radio frequency circuit, the radio frequency circuit including a first terminal to be coupled to at least one antenna, an analog front end circuit comprising the first terminal, a frequency up-conversion circuit arranged in a signal transmission path and configured to frequency up-convert transmission signals, and a frequency down-conversion circuit arranged in a signal reception path and configured to frequency down-convert reception signals;
at least one radar circuit;
at least one communication circuit; and
a multiplexer coupled to the signal transmission path and the signal reception path of the radio frequency circuit, and including a second terminal coupled to the at least one radar circuit and a third terminal coupled to the at least one communication circuit,
wherein the multiplexer is configured to selectively couple the radio frequency circuit to the second terminal coupled to the at least one radar circuit, each configured to receive and transmit radar signals, or to the third terminal coupled to the at least one communication circuit, each configured to receive and transmit communication signals.

15. The system of claim 14, wherein the at least one radar circuit is a radar baseband circuit and the at least one communication circuit is a communication baseband circuit.

16. The system of claim 14, wherein the at least one communication circuit comprises a mobile network communication circuit.

17. The system of claim 14, wherein at least one of the at least one radar circuit or the at least one communication circuit comprises a digital signal processor.

18. A system, comprising:
a plurality of radio frequency circuits, each including a respective first terminal to be coupled to at least one antenna;
at least one radar circuit;
at least one communication circuit; and
a multiplexer coupled to each of the plurality of radio frequency circuits, the multiplexer including a second terminal coupled to the at least one radar circuit and a third terminal coupled to the at least one communication circuit,
wherein the multiplexer, in a mode of operation, is configured to couple each radio frequency circuit of a first subset of the plurality of radio frequency circuits to a respective associated radar circuit of the at least one radar circuit and to couple each radio frequency circuit of a second subset of the plurality of radio frequency circuits to a respective associated communication circuit of the at least one communication circuit to provide radar data and communication data concurrently through the multiplexer.

19. The radio frequency device of claim 18, wherein the multiplexer, in a further mode of operation, is configured to couple each radio frequency circuit of a first subset of the plurality of radio frequency circuits to its respective associated second terminal, couple at least a first radio frequency circuit of the second subset of the plurality of radio frequency circuits to its respective associated third terminal, and couple at least a second radio frequency circuit of the second subset of the plurality of radio frequency circuits to its respective associated second terminal, to provide radar data and communication data concurrently through the multiplexer and to enhance radar functionality.

20. A method for operating a system in a radar mode or in a communication mode, comprising:
performing, by a radio frequency circuit, a frequency up-conversion on transmission signals propagating on a signal transmission path of the radio frequency circuit;
performing, by the radio frequency circuit, a frequency down-conversion on reception signals propagating on a signal reception path of the radio frequency circuit;

coupling at least one of the signal transmission path or the signal reception path of the radio frequency circuit to a radar circuit for the radar mode, wherein the radar circuit is configured to receive and transmit radar signals, and coupling at least one of the signal transmission path or the signal reception path of the radio frequency circuit to a communication circuit for the communication mode, wherein the communication circuit is configured to receive and transmit communication signals.

21. The method of claim 20, wherein coupling the radio frequency circuit to the communication circuit comprises:

coupling the radio frequency circuit as a first subset of a plurality of radio frequency circuits to the communication circuit, and coupling a remaining subset of the plurality of radio frequency circuits to the radar circuit or to a further radar circuit.

22. The method of claim 20, further comprising:

while the radio frequency circuit is coupled to the communication circuit, detecting an object based on a signal received via another radio frequency circuit that is coupled to a another radar circuit, and in response to detecting the object, decoupling the radio frequency circuit from the communication circuit and coupling the radio frequency circuit to the radar circuit.

* * * * *